US008520609B2

(12) United States Patent
Singh et al.

(10) Patent No.: US 8,520,609 B2
(45) Date of Patent: Aug. 27, 2013

(54) DATA SERVICES ROAMING WITHOUT FULL MOBILE INTERNET PROTOCOL (MIP) SUPPORT

(75) Inventors: Lokdeep Singh, Ellicott City, MD (US); Marcus V. K. Rodrigues, Rockville, MD (US); Johannes Gudmundsson, Kopavogur (IS)

(73) Assignee: Mach S.A.R.L., Contern (LU)

( * ) Notice: Subject to any disclaimer, the term of this patent is extended or adjusted under 35 U.S.C. 154(b) by 39 days.

(21) Appl. No.: 12/448,867

(22) PCT Filed: Jan. 10, 2008

(86) PCT No.: PCT/US2008/050761
§ 371 (c)(1),
(2), (4) Date: Jun. 17, 2010

(87) PCT Pub. No.: WO2008/086474
PCT Pub. Date: Jul. 17, 2008

(65) Prior Publication Data
US 2010/0278122 A1 Nov. 4, 2010

Related U.S. Application Data (60) Provisional application No. 60/884,226, filed on Jan. 10, 2007.

(51) Int. Cl.
*H04W 4/00* (2009.01)
(52) U.S. Cl.
USPC ............................ 370/329; 370/401; 455/436
(58) Field of Classification Search
USPC ................. 370/328–388, 401–429, 436–460, 370/389–427, 352–356; 455/436–460
See application file for complete search history.

(56) References Cited

U.S. PATENT DOCUMENTS

| 7,039,404 | B2 | 5/2006 | Das et al. |
| 7,162,529 | B2 | 1/2007 | Morishige et al. |
| 7,218,618 | B2 | 5/2007 | Greis et al. |
| 7,324,517 | B1 | 1/2008 | Sundaresan et al. |
| 7,773,554 | B2 * | 8/2010 | Nasielski et al. ............. 370/328 |
| 2003/0224788 | A1 * | 12/2003 | Leung et al. ............... 455/435.1 |
| 2004/0139201 | A1 | 7/2004 | Chaudhary et al. |

(Continued)

FOREIGN PATENT DOCUMENTS
WO WO2005/057961 A1 6/2005

OTHER PUBLICATIONS

International Search Report of PCT/US2008/50761, mailed Apr. 10, 2008 (1 page).

(Continued)

*Primary Examiner* — Ricky Ngo
*Assistant Examiner* — Iqbal Zaidi
(74) *Attorney, Agent, or Firm* — Hamilton, Brook, Smith & Reynolds, P.C.

(57) ABSTRACT

A method and apparatus for providing an interface between a visited network that supports the Simple Internet Protocol (SIP) and a home network that supports the Mobile Internet Protocol (MIP) includes establishing a SIP compatible tunnel between an access gateway process in the visited network and a Proxy Mobile Node of a local process. An MIP compatible tunnel is established between a Home Agent (HA) in the home network and a Proxy Foreign Agent of the local process. Data packets received at the local process over one tunnel are transmitted over the other using data packet encapsulation.

19 Claims, 6 Drawing Sheets

(56) References Cited

U.S. PATENT DOCUMENTS

| | | |
|---|---|---|
| 2005/0286471 A1 | 12/2005 | Yang et al. |
| 2006/0045080 A1* | 3/2006 | Islam et al. .................. 370/389 |
| 2006/0153120 A1 | 7/2006 | Channasamudhram |
| 2007/0025329 A1* | 2/2007 | Chen ............................ 370/352 |
| 2007/0254661 A1* | 11/2007 | Chowdhury et al. ......... 455/436 |

OTHER PUBLICATIONS

Pang, Ai-Chun, et al., "Mobility and Session Management: UMTS vs. CDMA2000," *IEEE Wireless Communications*, pp. 30-43 (Aug. 2004) (Day not given.).

* cited by examiner

DATA SERVICES ROAMING WITHOUT FULL MOBILE INTERNET PROTOCOL (MIP) SUPPORT

CROSS-REFERENCE TO RELATED APPLICATIONS

This application is the U.S. National Stage of International Application No. PCT/US2008/050761, filed Jan. 10, 2008, which designates the U.S., published in English and claims the benefit of U.S. Provisional Application No. 60/884,226, filed Jan. 10, 2007. The entire teachings of the above application(s) are incorporated herein by reference.

BACKGROUND OF THE INVENTION

1. Field of the Invention

The present invention relates to data services in communications networks that serve mobile stations.

2. Description of the Related Art

In communications networks, a network node is a network device or computer or specialized device connected by one or more communication links. Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links.

Multiple communications networks have evolved that support wireless communications with a mobile communications device, called a mobile station (MS), such as a cell phone, a personal digital assistant (PDA) and a lap top computer. The Global System for Mobile Communications (GSM) is a digital cellular technology that is used worldwide, predominantly in Europe and Asia. GSM is the world's leading standard in digital wireless communications. GSM supports real time digital voice and multimedia streams. In the process of setting up sessions across the GSM network to carry such real time streams, signaling data packets are sent among network nodes. These signaling data packets use a signaling protocol, such as Signal System 7 (SS7), and are usually transparent to the user of the MS. The signaling data packets indicate the network address and other properties of the two communicating end stations (such as a dialed telephone number) and reserve network resources to support the communications. In some applications the signaling data packets are used to support short data messaging (SMS) and other data services.

General Packet Radio Service (GPRS) is a mobile communications technology that enables mobile wireless service providers to offer packet-based data services over GSM networks to their mobile subscribers. GPRS is considered to be between a second generation and a third generation wireless technology, and is designated a 2.5 G technology in the industry. Common applications of GPRS include Internet access, intranet/corporate access, instant messaging, and multimedia messaging. GPRS was standardized by the European Telecommunications Standards Institute (ETSI), but today is standardized by the Third Generation Partnership Program (3GPP).

CDMA2000 is a protocol of mobile telecommunications standards that uses Code Division Multiple Access (CDMA) radio technology, a multiple access scheme for digital radio, to send voice, data, and signaling data between mobile phones and cell sites. The CDMA technology offers high throughput, real-time services, and end-to-end quality of service (QoS), and is designed to deliver pictures, graphics, video communications, and other multimedia information as well as voice and data to the MSs of mobile wireless subscribers. CDMA permits many simultaneous transmitters on the same frequency channel, unlike time division multiple access (TDMA) used in GSM, and frequency division multiple access (FDMA) used in "analog" cellular. CDMA2000 is considered a hybrid 2.5 G and third generation (3 G) technology in the industry. CDMA2000 is not used by GSM networks. CDMA2000 is standardized by 3GPP2.

The Universal Mobile Telecommunication System (UMTS) is a third generation (3 G) mobile communications technology that provides Wide-band CDMA. UMTS is standardized by 3GPP.

As is well known to even the casual MS user, as the MS is moved from one location to another, the subscriber may leave the area of the subscriber's home wireless network service provider and enter the area serviced by another wireless network service provider, called the visited network. While in the area of the visited network, the MS is said to be roaming. The visited network may be using a different wireless data service technology, for example the visited network might use GPRS instead of CDMA2000 used by the home network.

TIA-1068 and 3GPP2 X.S0034 are standards by the Telecommunications Industry Association (TIA) and 3GPP2, respectively, that specify the support of roaming between CDMA2000 packet data systems and GPRS packet data systems (release 97, 98 and 99). The goal of these standards is to minimize additional requirements on the CDMA2000 packet data systems for implementation of roaming between CDMA and GPRS (called CDMA/GPRS packet data roaming herein). The standards specify the support of Mobile Internet Protocol (MIP) version 4 (MIPv4) and Simple Internet Protocol (SIP). According to these standards, the use of MIP requires MIP support by both the CDMA and GPRS networks as well as by the MS used. CDMA development group (CDG) has mandated the use of MIP by all CDMA networks. Like most CDMA networks, CDMA2000 supports MIP. UMTS networks also support MIP.

SUMMARY OF THE INVENTION

In one set of embodiments, a method provides an interface between a visited network (such as a General Packet Radio Service (GPRS) network) that supports the Simple Internet Protocol (SIP) and a home network that supports the Mobile Internet Protocol (MIP). This is done by establishing a SIP compatible tunnel (such as a GPRS Tunneling Protocol (GTP) tunnel) between an access gateway (such as a Serving GPRS Support Node (SGSN)) in the visited network and a Proxy Mobile Gateway of a local process. An MIP compatible tunnel (such as a generic routing encapsulation (GRE) tunnel or an IP-in-IP tunnel) is established between a Home Agent (HA) in the home network and a Proxy Foreign Agent of the local process. Data packets received at the local process over one tunnel are transmitted over the other using packet encapsulation.

In other embodiments, an apparatus or logic encoded in software is configured to perform one or more steps of the above method.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for data service roaming across different communications networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of roaming from a home CDMA2000 network that does support the Mobile Internet Protocol (MIP) to a visited GPRS network that does not support MIP. However, the invention is not limited to this context. In other embodiments other home networks are used that support MIP while either the visited network of GPRS or other protocols, or the roaming mobile station, or both, does not support MIP. It will be appreciated that the systems and techniques described herein have a number of applications, including, for example: email, web page content or Multimedia Messaging Service (MMS) delivery to a Dual-Mode CDMA EvDO MIP/GPRS SIP-only device. It will further be appreciated that the described systems and techniques may be used to enable a CDMA operator to continue using an existing Research In Motion (RIM)/Blackberry infrastructure and RIM carrier account while roaming in GPRS/UMTS using a dual-mode, Blackberry-type device.

Each packet sent over a communications network typically comprises 1] header information associated with a particular protocol, and 2] payload information that follows the header information and contains information that may be processed independently of that particular protocol. Often, the data in the payload for the particular protocol includes a header and payload for a different protocol associated with a process operating at one or more nodes. The protocol in a payload of another protocol is said to be encapsulated in the other protocol. A tunnel is a protocol that encapsulates data packets of another protocol. The headers included in a packet traversing multiple heterogeneous networks, such as the Internet and cellular telephone signaling networks, typically include a physical (layer 1) header, a data-link (layer 2) header, an internetwork (layer 3) header and a transport (layer 4) header, as defined by the Open Systems Interconnection (OSI) Reference Model. A router is a network node that forwards data packets based on information in the layer 3 header. A protocol header and payload is called a message, frame, datagram, or cell and although the terms are sometimes used to distinguish the portions of different protocols, these terms are used interchangeably herein.

For the convenience of the reader, many of the acronyms used herein are defined in the following table.

| | |
|---|---|
| 3GPP | Third Generation Partnership Program, an industry standards body for wireless telecommunications |
| 3GPP2 | Third Generation Partnership Program 2, a industry standards body for wireless telecommunications that supersedes 3GPP |
| AAA | Authentication, Authorization, and Accounting (AAA) server using an AAA protocol. Example well-known AAA servers include the Remote Authentication Dial In User Service (RADIUS) server, Terminal Access Controller Access Control System (TACACS), and the Diameter server. |
| ANSI | American National Standards Institute, a standardization body. |
| APN | Access point name in PDP messages |
| CDMA | Code Division Multiple Access, which is a standard for mobile digital radio access that uses codes based on pseudo random number (PN) sequences to identify different channels |
| CDMA2000 | A particular implementation of CDMA |
| CRX | CDMA Roaming eXchange, infrastructure for passing information from a CDMA network to another network where a subscriber is visiting |
| FA | Foreign Agent, in Mobile IP a foreign agent is a router which stores information about mobile nodes visiting its network. Foreign agents also advertise care-of addresses which are used by Mobile IP. |
| GGSN | Gateway GPRS Support Node, a network node that acts as a gateway between a GPRS wireless data network and other networks, such as the Internet |
| GPRS | General Packet Radio Service, which is a standard for mobile data services used on GSM and IS-136 mobile phones. |
| GRE | Generic Routing Encapsulation (GRE) used to tunnel communications between an external packet data network and a mobile station for MIP |
| GRX | GPRS Roaming eXchange, a dedicated (secure & private) IP network for interconnecting GPRS and UMTS operators networks |
| GSM | Global System for Mobile Communications, a cell phone standard developed for Europe and now used worldwide. |

-continued

| | |
|---|---|
| GTP | GPRS Tunneling Protocol. An implementation of a Packet Data Protocol (PDP) tunneling protocol that is used to communicate between an external packet data network and a mobile station in a GPRS network |
| HA | Home Agent, a node on the home network that has the profile of the user of a mobile station. In Mobile IP, a home agent is a router on a mobile node's home network which tunnels datagrams for delivery to the mobile node when it is away from home, and maintains current location information for the mobile node. It is used with one or more foreign agents |
| HLR | Home Location Register, a central database that contains details of each mobile phone subscriber that is authorized to use the GSM core |
| IP | Internet Protocol, a pervasive layer 3 protocol used to direct data packets between nodes on any of multiple connected networks |
| IS-136 | International Standards 136, which is a recent generation of the digital standard TDMA technology |
| MIP | Mobile Internet Protocol |
| MMS | Multimedia Messaging Service |
| MPFA | MIP Proxy Foreign Agent, a process in a MIP Proxy process |
| MPMG | MIP Proxy Mobile Gateway, a process in a MIP Proxy process, |
| MPMN | MIP Proxy Mobile Node, a process in a MIP Proxy process |
| MS | Mobile station, such as a cell phone, a personal data assistant (PDA), or laptop computer that terminates communications with another node on one or more networks |
| PDA | Personal data assistant, a handheld device that may use wireless communications |
| PDP | Packet Data Protocol used to communicate between a mobile station and GPRS. For example, a PDP context is established among an MS (Mobile Station), an RNC (Radio Network Controller), an SGSN (Serving GPRS Support Node) (in-zone node), and a GGSN (Gateway GPRS Support Node) (gateway node) which constitute the GPRS system. Note that the MS and the SGSN are connected by an RAN (Radio Access Network) and the SGSN and the GGSN are connected by a core network (backbone network) |
| PDSN | The Packet Data Serving Node is a component of a CDMA2000 mobile network. It acts as the connection point between the Radio Access and IP networks. This component is responsible for managing PPP sessions between the mobile provider's core IP network and the mobile station (read mobile phone). It is similar in function to the GGSN (GPRS Gateway Support Node) that is found in GSM and UMTS networks |
| PPP | Point-to-Point Protocol, provides a standard method for transporting any of multiple protocol data packets over point-to-point links from a local node to an access point for a wide area network. |
| RADIUS | Remote Authentication Dial In User Service (RADIUS) server, a particular type of AAA server. |
| RAN | Radio Access Network |
| SGSN | Serving GPRS Support Node, a network node that provides GPRS services |
| SIP | Simple Internet Protocol |
| SMS | Short Message Service, a system for collecting and forwarding short text messages over telephone signaling channels |
| TDMA | Time Division Multiple Access, which is a standard for mobile digital radio access that divides a radio channel up into discrete time intervals |
| TIA | Telecommunications Industry Association, a standards body for international telecommunications |
| TIA-1068 | A TIA standard for roaming between systems using CDMA2000 and GPRS |
| UMTS | Universal Mobile Telecommunications System, a third generation (3G) mobile communications technology that provides wide-band CDMA. |
| VHE | Virtual Home Environment, a system concept for personalized service portability across network boundaries and between terminals |
| VLR | Visitor Location Register, a central database that contains details of each mobile phone subscriber that is visiting the mobile network |
| VPN | Virtual Private Network, a private network that encompasses links across shared or public networks like the Internet to send data between two computers across the shared or public internetwork in a manner that emulates the properties of a point-to-point private link. |
| WAP | Wireless Application Protocol, designed to show internet-contents on wireless clients, like mobile phones |
| WWW | World Wide Web, a collection of documents stored on nodes of multiple networks and using a format that allows the documents to be linked to each other |
| X.S0034 | A 3GPP2 standard for roaming between systems using CDMA2000 and GPRS |

1. Network Overview

Figure 1:
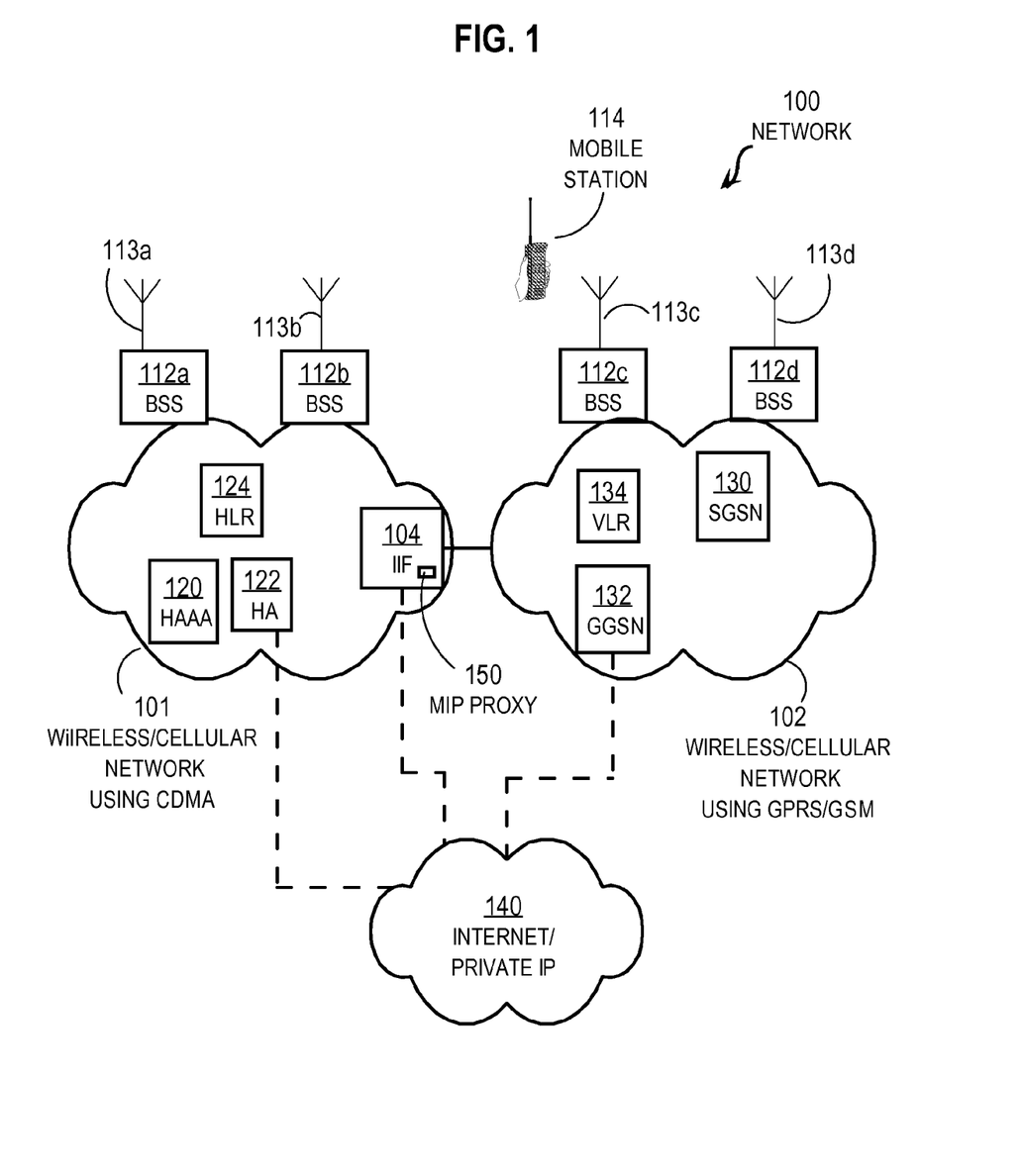
FIG. 1 is a block diagram that illustrates example networks involved in data roaming between CDMA and GPRS networks, according to an embodiment.

FIG. 1 is a block diagram that illustrates example network 100 involved in data roaming between CDMA and GPRS networks, according to an embodiment. In the illustrated embodiment, the network 100 includes the public Internet or other private Internet Protocol (IP) network 140 (called simply the Internet 140 hereinafter), a wireless/cellular network using CDMA for data services (called herein a CDMA network 101) and a wireless/cellular GSM network using GPRS for data services (called herein a GPRS network 102). A mobile station 114, such as a cell phone, communicates via one or more antennae within radio range to a corresponding base station system (BSS) which is connected to a backbone wired network. In the illustrated embodiment, antenna 113a, 113b, 113c, 113d (among others not shown, collectively referenced hereinafter as antennae 113) are connected to BSS 112a, 112b, 112c, 112d, respectively (among others, not shown, collectively referenced herein as BSS 112). BSS 112a and BSS 112b are connected to CDMA network 101; and BSS 112c and BSS 112d are connected to GPRS network 102.

It is assumed for purposes of illustration that mobile station 114 belongs to a subscriber of the service provider that operates CDMA network 101; thus, CDMA network 101 is the home network for mobile station 114. It is further assumed for purposes of illustration that mobile station 114 is within radio range only of antenna 113c of GPRS network 102; thus, GPRS network 102 is the visited network for mobile station 114 in the configuration depicted in FIG. 1, and mobile station 114 is said to be roaming in visited GPRS network 102.

The home CDMA network 101 includes a home Authentication, Authorization and Accounting (AAA) server, designated HAAA 120. The HAAA 120 holds data that indicates the subscriber profile for every subscriber of the home CDMA network 101, including the subscriber for mobile station 114.

The client-server model of computer process interaction is widely known and used in commerce. According to the client-server model, a client process sends a message including a request to a server process, and the server process responds by providing a service. The server process may also return a message with a response to the client process. Often the client process and server process execute on different computers or other communicating devices or network nodes, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. Similarly, the term "module" is conventionally used to refer to the process that performs some function, or the host computer on which the process operates As used herein, the terms "client" and "server" and "module" refer to the processes, rather than the host nodes, unless otherwise clear from the context. In addition, the process performed by a server or module can be broken up to run as multiple processes on multiple hosts (sometimes called tiers) for reasons that include reliability, scalability, and redundancy, but not limited to those reasons.

The home CDMA network 101 also includes Home Location Register server (HLR) 124, a central database server that contains details of each mobile phone subscriber that is authorized to use a roaming data service, including the identifier of the base station or gateway to another network through which the mobile station is currently communicating.

The home CDMA network 101 also includes a Home Agent process (HA) 122. According to MIP, data traffic for the mobile station, such as traffic with the Internet 140, is routed through HA 122. The HA sends that traffic in a MIP implementation of a Generic Routing Encapsulation (GRE) tunnel or Internet Protocol-in-Internet Protocol (IP-in-IP) tunnel through the BSS or visited network through which the mobile station is communicating.

The visited GPRS network 102 includes Visitor Location Register server (VLR) 134. The VLR is a central database server that contains details of each mobile phone subscriber that is visiting the GSM/GPRS network, including indications of those subscribers authorized to use a roaming data service.

The visited GPRS network 102 also includes a Serving GPRS Support Node (SGSN) that provides GPRS data services. Data traffic from mobile stations using GPRS are routed through SGSN. The visited GPRS network 102 also includes Gateway GPRS Support Node (GGSN) 132 that acts as a gateway between a GPRS network 102 and other networks, such as the Internet 140. According to GPRS, data traffic for the mobile station from another network is tunneled from a GGSN in a home GPRS network through the SGSN in the visited GPRS network to the mobile station using a GPRS Tunneling Protocol (GTP) tunnel.

The network 100 includes an Interoperability and Interworking Function module (IIF) 104. The 3GPP2 standard specifies that the IIF simulates different network functions based on the packet data roaming mode. For MIP functionality, the standard assumes that MIP is supported in the home and visited networks and in the mobile station. However, some legacy GPRS networks do not support MIP (and thus do not have a Home Agent and Foreign Agent as required for MIP), and many legacy mobile stations using a GPRS mode do not support MIP while operated in the GPRS mode.

Although a particular number of mobile stations 114, antennae 113, BSSs 112, networks 101, 102, 140 and processes are shown for purposes of illustration, in other embodiments a network includes more or different mobile stations, antennae, BSSs, networks and processes.

According to the illustrated embodiments, the IIF 104 includes a MIP Proxy process 150. The MIP proxy process 150 is engaged when the visited network, or mobile station roaming in the visited network, or both, does not support MIP. For purposes of illustration, it is assumed that visited GPRS network 102 does not support MIP.

2. Data Service Roaming Overview

End-to-end MIP support is desired to support various home-network-based services such as Wireless Application Protocol (WAP), Virtual Home Environment (VHE), Virtual Private Network (VPN), and the like. However, MIP may not be supported in "GPRS foreign mode," e.g., when a CDMA packet data subscriber is roaming on a GPRS system, as MIP support is not available on all GPRS networks. In addition, terminal devices, such as a GPRS or dual-mode CDMA/GPRS handset, may not support the required MIP client. Lack of MIP support across different networks and terminal devices causes a non-uniform experience for the user as home service can not be provided in a seamless manner while roaming.

Figure 2:
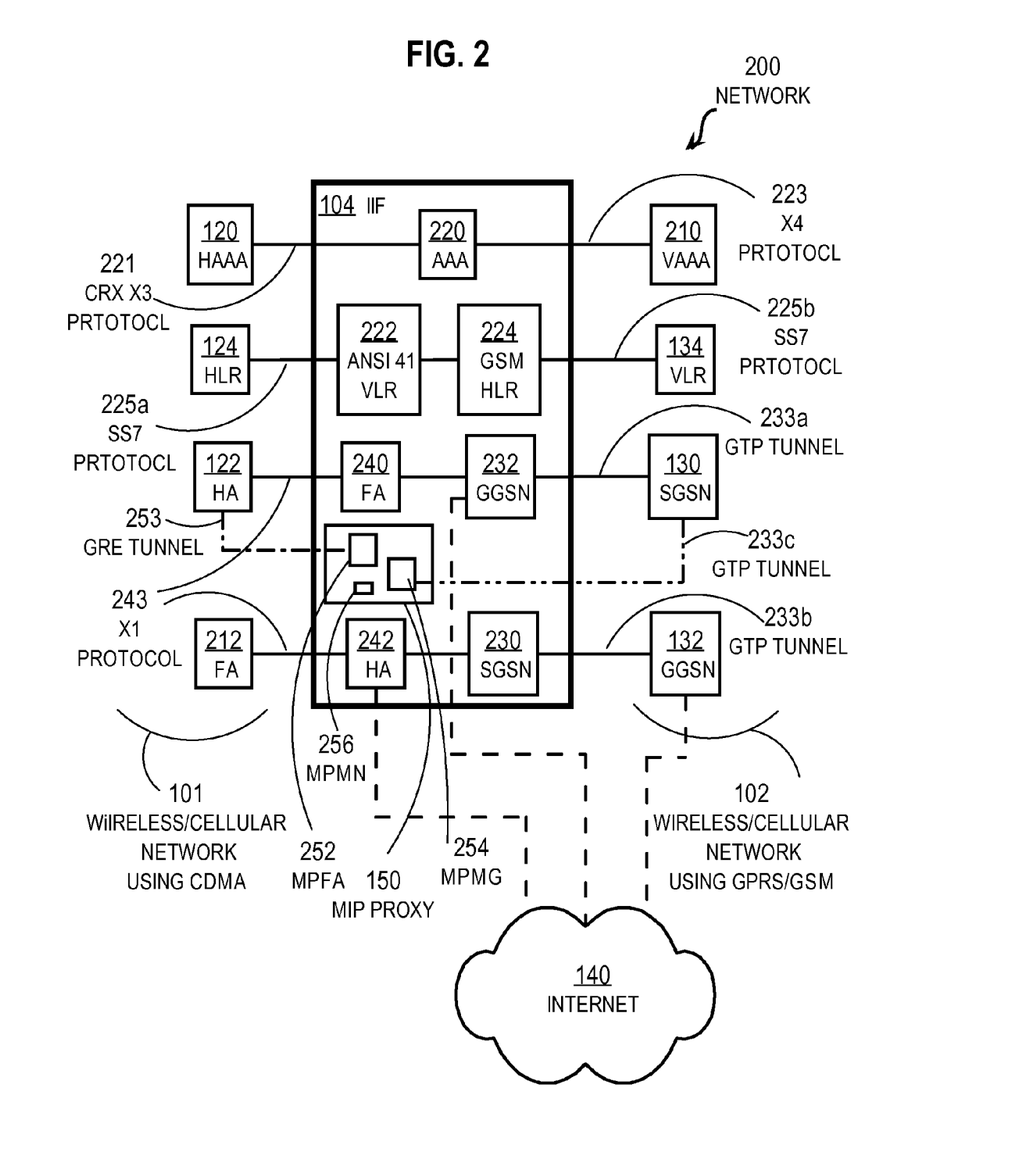
FIG. 2 is a block diagram that illustrates an example Interoperability and Interworking Function (IIF) module for data services that cross between a CDMA network and a GPRS network, according to an embodiment.

FIG. 2 is a block diagram that illustrates an example Interoperability and Interworking Function (IIF) module 104 for data services that cross between a CDMA network 101 and a GPRS network 102 in an example network 200, according to an embodiment. Example network 200 is a subset of example network 100, and includes a home CDMA network 101, a visited GPRS network 102, and the Internet 140. The home CDMA network 101 includes the HAAA 120, HLR 124 and HA 122. The home CDMA network 101 also includes a MIP Foreign Agent (FA) 212 (not shown in FIG. 1). In Mobile IP, the FA is a router which stores information about mobile nodes visiting its network, e.g., a mobile station from GPRS network 102 roaming in CDMA network 101. Foreign Agents also advertise care-of addresses which are used by Mobile IP. Foreign Agents route data traffic to a home agent in another network. The visited GPRS network 102 includes the VLR 134, SGSN 130 and GGSN 132. The visited GPRS network 102 also includes a visited AAA server, designated VAAA 210 (not shown in FIG. 1).

According to the extant standards at the time of this writing, the IIF 104 includes an AAA server 220, an American National Standards Institute (ANSI) 41 VLR server 222, a GSM HLR server 224, a FA process 240, a GGSN process 232, a HA process 242 and a SGSN process 230. The HAAA 120 communicates with the AAA 220 in IIF 104 according to the CDMA Roaming eXchange (CRX) protocol using a message format called an X3 interface. This communication path is indicated as the CRX X3 protocol 221. The VAAA 210 communicates with the AAA 220 in IIF 104 using a message format called an X4 interface of the CRX protocol (although some CDMA operators may connect the AAA servers via Internet without CRX). This communication path is indicated as the X4 protocol 223. The HLR 124 communicates with the ANSI 41 VLR 222 in IIF 104 according to the Signaling System 7 (SS7) protocol. This communication path is indicated as the SS7 protocol path 225a. The VLR 134 communicates with the GSM HLR 224 in IIF 104 using SS7 protocol path 225b.

The HA 122 communicates with the FA 240 in IIF 104 using a message format called an X1 interface of the CRX protocol. This communication path is indicated as the X1 protocol 243. Similarly, the FA 212 communicates with the HA 242 in IIF 104 using the X1 protocol 243.

The SGSN 130 communicates with the GGSN 232 in IIF 104 according to the GPRS Tunneling Protocol (GTP) 233a. Similarly, the GGSN 132 communicates with the SGSN 230 in IIF 104 using GTP tunnel 233b.

When both the GPRS network 102 and the mobile station support MIP, a MIP tunnel is carried from HA 122 through FA 240 through GGSN 232 through SGSN 130 to the mobile station. Similarly, a MIP tunnel is formed from the FA 212 through HA 242 through SGSN 230 through GGSN 132 for a visitor from a GPRS network to a CDMA network.

According to the illustrated embodiment, the IIF 104 also includes the MIP Proxy process 150. The MIP Proxy process 150 includes a MIP Proxy Foreign Agent (MPFA) 252, a MIP Proxy Mobile Gateway (MPMG) 254 and a MIP Proxy mobile node (MPMN) 256. The MPFA 252 replaces the standard FA 240 and communicates with the HA 122 via a MIP GRE tunnel 253. The MPMG 254 communicates with the SGSN 130 via a GTP tunnel 233c. The MPFA 252 also communicates with the MPMG 254 and the MPMN 256 using any internal protocol, including any proprietary protocol, because these communications are internal to the IIF. The operation of MIP Proxy process 150 is described in detail in a later section.

Figure 3:
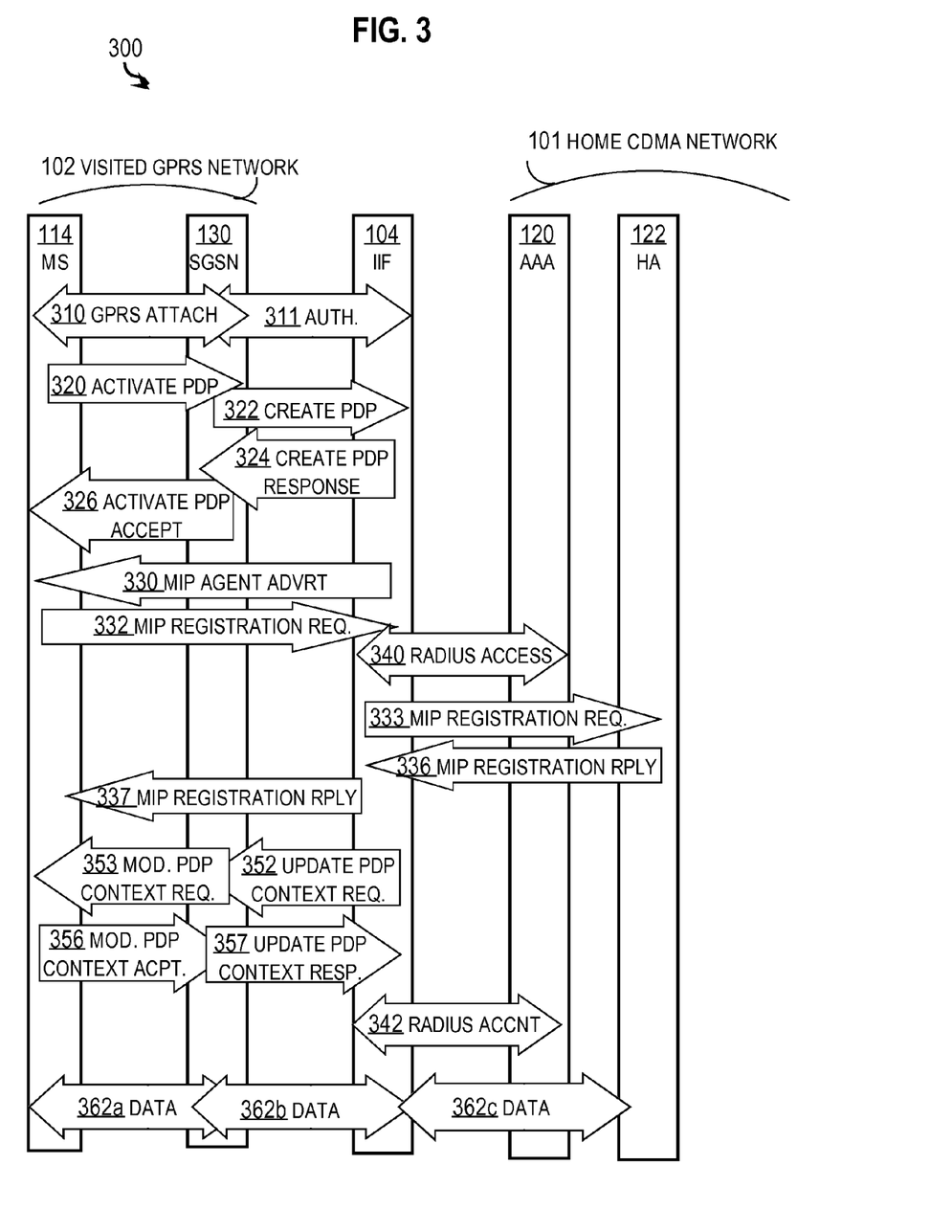
FIG. 3 is a message sequence diagram that illustrates an example sequence of messages exchanged for establishing roaming data services when MIP is supported in both networks, according to an embodiment.

The circumstances under which the extant standards fail to provide for end to end data services are described with reference to FIG. 3. FIG. 3 is a message sequence diagram 300 that illustrates an example sequence of messages exchanged for establishing roaming data services when MIP is supported in both networks (and the roaming mobile station), according to an embodiment. In FIG. 3 time increases downward. Network processes are indicated by the time-elongated rectangles; and messages transmitted at a particular time are indicated by arrows from the sending process or node to the receiving process or node. It is anticipated that one or more processes may execute on the same host.

The FIG. 3 diagram 300 depicts message traffic among the roaming mobile station MS 114, the SGSN 130 in the visited GPRS network 102, the IIF module 104, and the HAAA server 120 and HA 122 in the home CDMA network 101.

Multiple standard messages are exchanged between the MS 114, SGSN 130 and IIF 104 to attach the MS 114 to the GPRS data services. These messages are depicted as the two way GPRS Attach messages 310. During this process the SGSN 130 authenticates the user by exchanging authentication messages 311 with AAA server 220 and HLR 224 in the IIF 104. After successful authentication and upon receiving a GPRS Update Location (UL) request from the SGSN, the Network Authentication Plane in the IIF 104, acting as the CDMA VLR 222, forwards an ANSI 41 'Regnot' message (not shown) to the CDMA HLR 124. Upon receiving positive acknowledgement from the CDMA HLR 124, the Network Authentication Plane of the IIF 104, continuing to act as the CDMA VLR 222 acknowledges and completes the GPRS attach.

After a successful authentication and GPRS attach, the MS 114 sends an Activate PDP Context Request message 320 to the SGSN 130. This message includes an Access Point Name (APN) that begins with MIPv4 if the MS 114 uses MIPv4 to access its home CDMA network 101. The SGSN determines the home network 101 and the corresponding IIF 104 based on the APN, e.g., by sending out an announcement (not shown) and receiving a reply (not shown) from the responsible IIF, or by information cached at the SGSN 130. The SGSN 130 sends a Create PDP Context Request message 322 to the appropriate IIF 104 with the value of the APN from the MS 114.

If the APN received from the MS via the SGSN during PDP context activation begins with 'MIPv4', the IIF considers that the MS uses the Mobile IPv4 to access its home CDMA packet data system, such as a CDMA2000 data packet system. The IIF creates the PDP context by setting PDP Address to 0.0.0.0 in the Create PDP Context Response message 324, indicating that PDP Address is assigned temporarily and will be updated in a later PDP message, after the MIP registration is completed successfully. The SGSN 130 forwards this PDP address to the MS 114 in an Activate PDP Context Accept message 326.

After PDP context with 0.0.0.0 PDP Address is activated, the IIF 104 sends the MIP Agent Advertisement message 330 to the MS 114 over the established PDP Context via the SGSN 130. The MS 114 then requests MIP registration in an MIP Registration Request message 332 to the IIF 104 via the SGSN 130. This message is processed by the GGSN module 232 in the IIF 104. Upon receiving the MIP Registration Request from the MS, in messages indicated by RADIUS Access messages 340, the IIF 104 requests the AAA server 120 (e.g., the AAA server 220 requests verification via a CRX communication with the HAAA 120) to verify the MS AAA authenticator. If the IIF AAA 220 receives the RADIUS Access-Accept message from the H AAA 120, then the IIF 104 forwards the MIP Registration Request message from the IIF GGSN 232 through the IIF FA 240 to the HA 122 in the home CDMA packet data system as message 333. If the IIF AAA 220 receives the RADIUS Access-Reject message from the Home AAA, then the IIF discards the MIP Registration Request message and sends an Registration Reply message 337 with the error value 67 indicating Bad Authentication.

Upon receiving the MIP Registration Reply message 336 from the HA 122, the IIF forwards it through the IIF FA 240 and IIF GGSN 232 to the MS 114 over the established PDP Context through SGSN 130; thus completing the MIP registration.

After the MIP registration is completed successfully, the IIF performs the PDP context update by setting the PDP Address to the home address of the MS 114 learned from the reply message 336. An update PDP Context Request message 352 is sent from the IIF 104 to the SGSN 130 with the home address of the MS 114. The SGSN 130 then sends a Modify PDP Context Request message 353 to the MS 114. In response, the MS 114 sends a Modify PDP Context Accept message 356 to the SGSN 130. The SGSN sends the Update PDP Context Response message 357 back to the IIF 104, thus completing the PDP update process and allowing MIP tunneling of data packets directed to the home address of the MS 114.

In the illustrated embodiment, after the PDP update, additional RADIUS accounting messages 342 are sent between the IIF 104 and HAAA 120, to determine if there is sufficient credit to pay for the data services. If so, then data packets 362a sent by the MS 114 are tunneled to the SGSN 130 and from there tunneled as data packets 362b to the IIF 104 and from there tunneled to the HA 122, as data packets 362c. The HA 122 directs the data packets to their destination as data packets (not shown). Similarly, data packets received at the HA 122 are tunneled to the IIF 104 as data packets 362c and from the IIF 104 tunneled to the SGSN 130 as data packets 362b and from the SGSN 130 tunneled to the MS 114 as data packets 362a.

The above description illustrates MIP registration according to the 3GPP2 framework.

From the above description, it is clear that an MS 114 that does not support MIP in a GPRS roaming mode, will not include data indicating MIPv4 in its Activate PDP Context Request message 320 and not induce the MIP Agent Advertisement message 330 over the PDP context between the MS 114 and the IIF 104. Thus data roaming will not be supported in this instance by the 3GPP2 framework.

It is also to be noted that if the GPRS network 102 supports only GTP version 0, then the GPRS network can not handle MIP registration specific messages like Update PDP Context messages 352, 353, 356 and 357 when initiated by GGSN and therefore can not form an MIP tunnel from the IIF 104 to the MS 114. Thus data roaming will not be supported by the 3GPP2 framework in this instance, either.

3. MIP Proxy Process on IIF

As shown in FIG. 2, a new MIP Proxy process 150 is introduced to the IIF 104. The MIP Proxy process 150 includes a MIP Proxy Mobile Node (MPMN) 256 that acts as a mobile node and a MIP Proxy Foreign Agent (MPFA) 252 that acts as a Foreign Agent and a MIP Proxy Mobile Gateway (MPMG) 254 that acts as a gateway to a foreign network. The MIP Proxy function 150 allows for "MIP always" support, independent of MIP support at the visited GPRS network 102 and mobile station MS 114.

Figure 4:
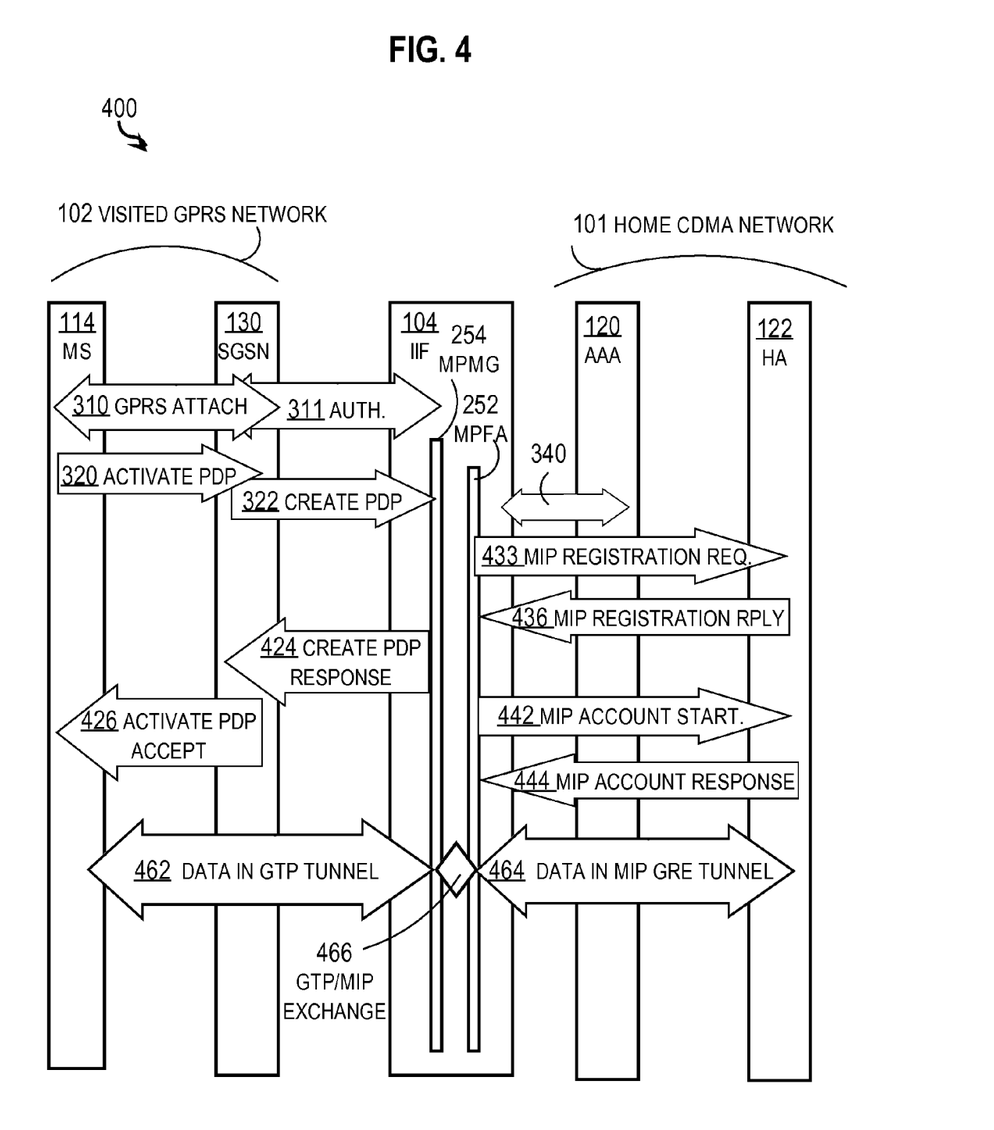
FIG. 4 is a message sequence diagram that illustrates example sequence of messages exchanged for establishing roaming data services when MIP is not supported in the GPRS network or mobile station, according to an embodiment.

FIG. 4 is a message sequence diagram 400 that illustrates example sequence of messages exchanged for establishing roaming data services when MIP is not supported in the GPRS network or mobile station, or both, according to an embodiment.

The diagram 400 depicts message traffic among the roaming mobile station MS 114, the SGSN 130 in the visited GPRS network 102, the IIF module 104, and the HAAA server 120 and HA 122 in the home CDMA network 101.

As described above in reference to FIG. 3, multiple standard messages are exchanged between the MS 114, SGSN 130 and IIF 104 to attach the MS 114 to the GPRS data services. These messages are depicted as the two way GPRS Attach messages 310. During this process the SGSN 130 authenticates the user by exchanging authentication messages 311 with AAA server 220 in the IIF 104.

After a successful authentication and GPRS attach, the MS 114 sends an Activate PDP Context Request message 320 to the SGSN 130. This message includes an Access Point Name (APN) that begins with MIPv4 if the MS 114 uses MIPv4 to access its home CDMA network 101. The SGSN 130 sends a Create PDP Context Request message 322 to the appropriate IIF 104 with the value of the APN from the MS 114. If the mobile station 114 supports MIP, this APN value begins with MIPv4.

The IIF 104 determines whether either the GPRS network or the MS 114 or both does not support MIP. For example, in some embodiments, a MIP Proxy 150 in the IIF 104 determines that MIP is not supported by the handset if the APN does not begin with MIPv4; and MIP Proxy 150 in the IIF 104 determines that MIP is not supported by the visited network if the GTP version is earlier than GTPv1. If either the handset or the visited network does not support MIP, then a SIP compatible GTP version 0 tunnel is established with the MS 114 and a MIP compatible GRE tunnel is established with the HA 122. In these embodiments, the MPMG 254 replaces GGSN 232 of the standard IIF and exchanges PDP messages with the SGSN 130. When the subscriber registers for mobile data services, a MPMN 256 with subscriber credentials is installed in IIF for connected foreign networks. In these embodiments, the sequence of messages is sent as described in the following.

Upon receiving the Create PDP Context Request message 322 at MPMG 254, in messages indicated by RADIUS Access messages 340, the IIF 104 requests the AAA server 120 (e.g., the AAA server 220 requests verification via a CRX communication with the HAAA 120) to verify the MS AAA authenticator. If the IIF AAA 220 receives the RADIUS Access-Accept message from the HAAA 120, then the MPFA 252 generates and sends a MIP Registration Request message 433 to the HA 122. The credentials required for MIP setup are provided by the MPMN 256 to the MPFA 252. When the CDMA native subscriber in GPRS Foreign Mode requests to activate PDP Context, the MPMN/MPFA of the MIP Proxy process 150 sends an MIP request with the correct MN HA key, taken from the MPMN 256. The MIP request includes the following: (1) MN Network Authentication Identity (NAI); (2) MN HA key; and (3) AAA authenticator with T Bit set to 1 to enable a reverse tunnel. In some embodiments, the MIP request is optionally preceded by the RADIUS Authentication messages 340 described above, using the shared secret key, again derived from the MPMN 256. If the IIF AAA 220 receives the RADIUS Access-Reject message from the HAAA 120, then the IIF does not generate and send the MIP Registration Request message, and MIP compatible tunnels are not set up.

Note that, unlike the message diagram 300 described above, the Create PDP Response message is not sent to the visited GPRS network 102 before the MIP registration request message is sent, and a MIP registration request message is not awaited or received from the MS 114.

The HA 122 responds to the MIP Registration Request message 433 with a MIP Registration Reply message 436, which contains registration results, e.g., "successful" or an error code. If the MS requests a new home address, a new address is returned in the Registration Reply message 436; otherwise, the permanent address of the MS is returned. The described procedure sets up a MIP tunnel between MPFA 252 of IIF 104) and HA 122.

Upon receiving the MIP Registration Reply message 436 from the HA 122, the MPFA 252 has been informed of the home address of the MS 114. At this stage, the MPMG 254 acting as a GGSN of the IIF 104 acknowledges the Create PDP Request 322 from the SGSN and sets up a GTP tunnel. An IP address is assigned to the MS 114 by the GGSN 132 or a DHCP server in the sponsor GPRS network 102 or IIF 104 and sent in Create PDP Response message 424. A sponsor network is a GSM network providing access to its roaming agreements with other GSM networks through the use of its network resources such as HLR/VLR network addresses. The SGSN 130 forwards this PDP address to the MS 114 in an Activate PDP Context Accept message 426. Because the message 426 includes the proper home address for the MS 114, no update PDP context messages are needed (e.g., messages 352, 353, 356, 357 are not needed). Thus, a GPRS network that does not support GTP version 1, such as a GPRS network that supports only GTP version 0, is capable of setting up a GTP tunnel 233c from the IIF to the MS 114 through the SGSN 130.

The IIF Data Bearer Plane now joins the two tunnels and establishes an end to end packet tunnel, enabling all data traffic to traverse through the CDMA home Packet Data Serving Node (PDSN) via the HA 122. The Packet Data Serving Node is a component of a CDMA2000 mobile network. It acts as the connection point between the Radio Access network and IP networks. This component is responsible for managing PPP sessions between the mobile provider's wired IP network and the mobile station. It is similar in function to the GGSN (GPRS Gateway Support Node) that is found in GSM and UMTS networks.

To use the MIP tunnel, the MPFA 252 generates and sends an MIP Account Start message 442 to the HA 122. In response to receiving the MIP account start message 442, the HA 122 generates and sends a MIP Account Response message 444 to the MPFA 252.

Data packets 464 are then sent in a MIP GRE tunnel between the HA 122 and the MPFA 252. Data packets 462 are then sent in a GTE tunnel between the MS 114 and the MPMG 254. A GTP/MIP exchange process 466 in the MIP Proxy process connects the MPFA 252 and MPMG 254. An MIP payload is stripped from the data packets 464 received at the MPFA 252. The payload is sent to the MPMG 254. The MPMG 254 encapsulates the payload in the GTP tunnel and sends as data packets 462. Similarly, a GTP payload is stripped from the data packets 462 received at the MPMG 254. The payload is sent to the MPFA 252. The MPFA 252 encapsulates the payload in the MIP GRE tunnel and sends as data packets 464.

Thus, even though a MIP tunnel is not established in the visited GPRS network 102 and MS 115, data packets associated with a data service are delivered end to end through the GPRS network 102 to MS 114.

It will be appreciated that the systems and techniques described herein have a number of applications, including, for example: email, World Wide Web content and MMS delivery to a Dual-Mode CDMA EvDO MIP/GPRS SIP-only device. It will further be appreciated that the described systems and techniques may be used to enable a CDMA operator to continue using exiting RIM/Blackberry infrastructure and RIM carrier account while roaming in GPRS/UMTS using a dual-mode, Blackberry-type device.

Figure 5:
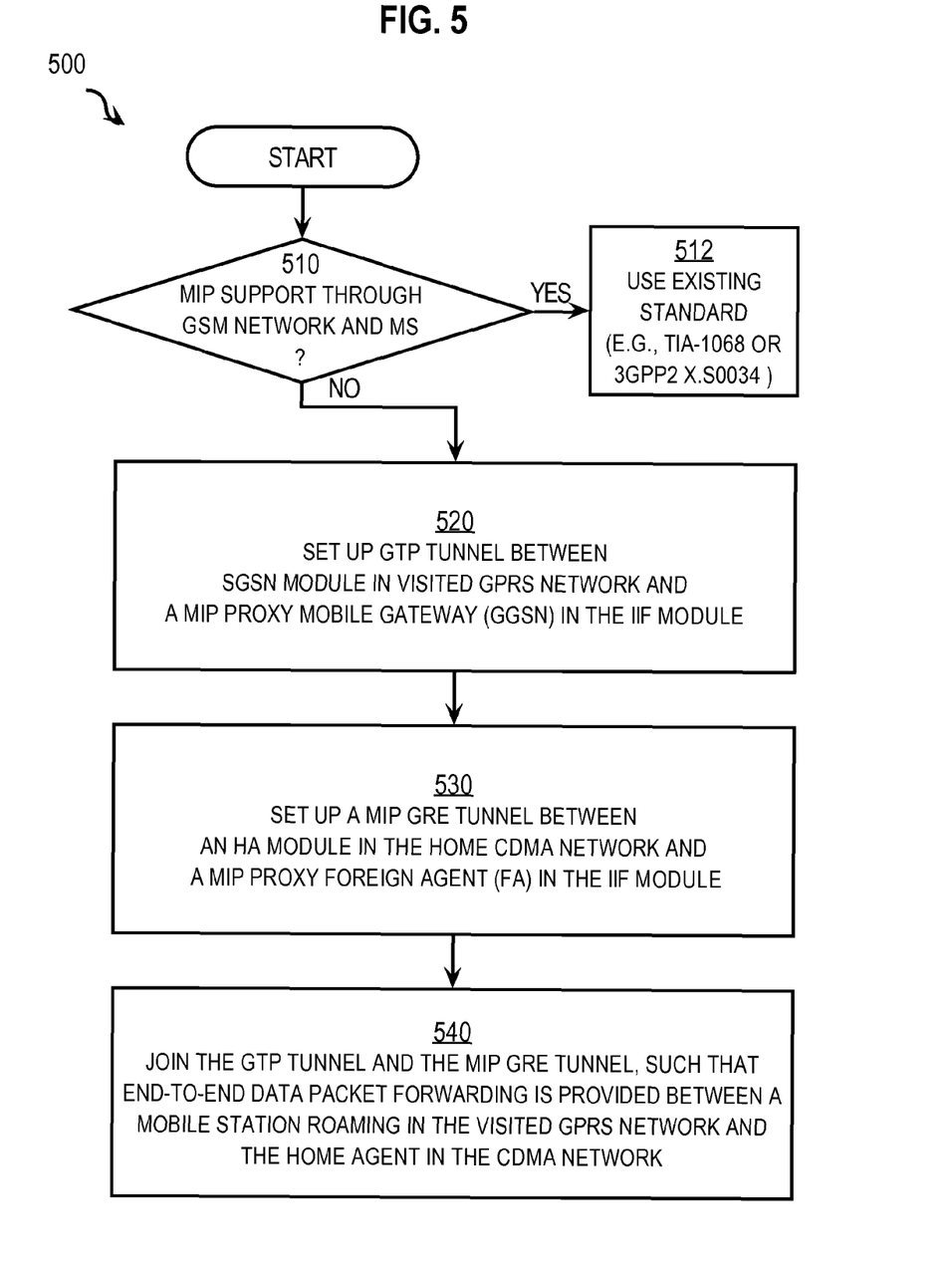
FIG. 5 is a flow chart that illustrates at a high level an example method for providing data roaming, according to an embodiment.

FIG. 5 is a flow chart that illustrates at a high level an example method 500 for providing data roaming, according to an embodiment. Although steps are shown in a particular order in FIG. 5 for purposes of illustration, in other embodiments, one or more steps may be performed in a different order or overlapping in time or one or more steps may be omitted or some combination of changes may be made. For example, in some embodiments, step 530 is performed before or concurrently with step 520.

In step 510 it is determined whether MIP is supported by both the visited network and the mobile station used with the visited network. In the illustrated embodiment, the visited network is a GPRS network, such as GPRS network 102, but in other embodiments, the visited network uses a different protocol. In some embodiments, step 510 is omitted.

If it is determined in step 510 that both the visited network and the mobile station support MIP, then control passes to step 512. In step 512, an existing standard is used to establish data services through the visited network. For example, TIA-1068 or 3GPP2 X.S0034 is used to provide roaming data services.

If it is determined in step 510 that both the visited network and the mobile station do not support MIP (i.e., that either one or both do not support MIP), then control passes to step 520.

In step 520, a SIP compatible tunnel (such as a GTPv0 tunnel) is set up between an access gateway node in the visited network (e.g. a SGSN module in visited GPRS network) and an MIP Proxy mobile gateway (e.g., a modified GGSN module) in a network interface process (such as an IIF module).

In step 530 a MIP GRE tunnel is set up between an Home Agent process in the home network (e.g. a home CDMA network) and an MIP Proxy Foreign Agent (MPFA) in the same network interface process (such as the same IIF module).

In step 540, the SIP compatible tunnel is joined to the MIP compatible tunnel such that end to end data packet forwarding is provided between a mobile station roaming in the visited network (such as the GPRS network) and the home agent in the home network (such as a CDMA network). For example, data packets received at the local process over one of the GTP and MIP/GRE tunnels are transmitted over the other using data packet encapsulation. That is, data frames received encapsulated in one of the two tunnels are sent encapsulated in the other.

4. Hardware Overview

Figure 6:
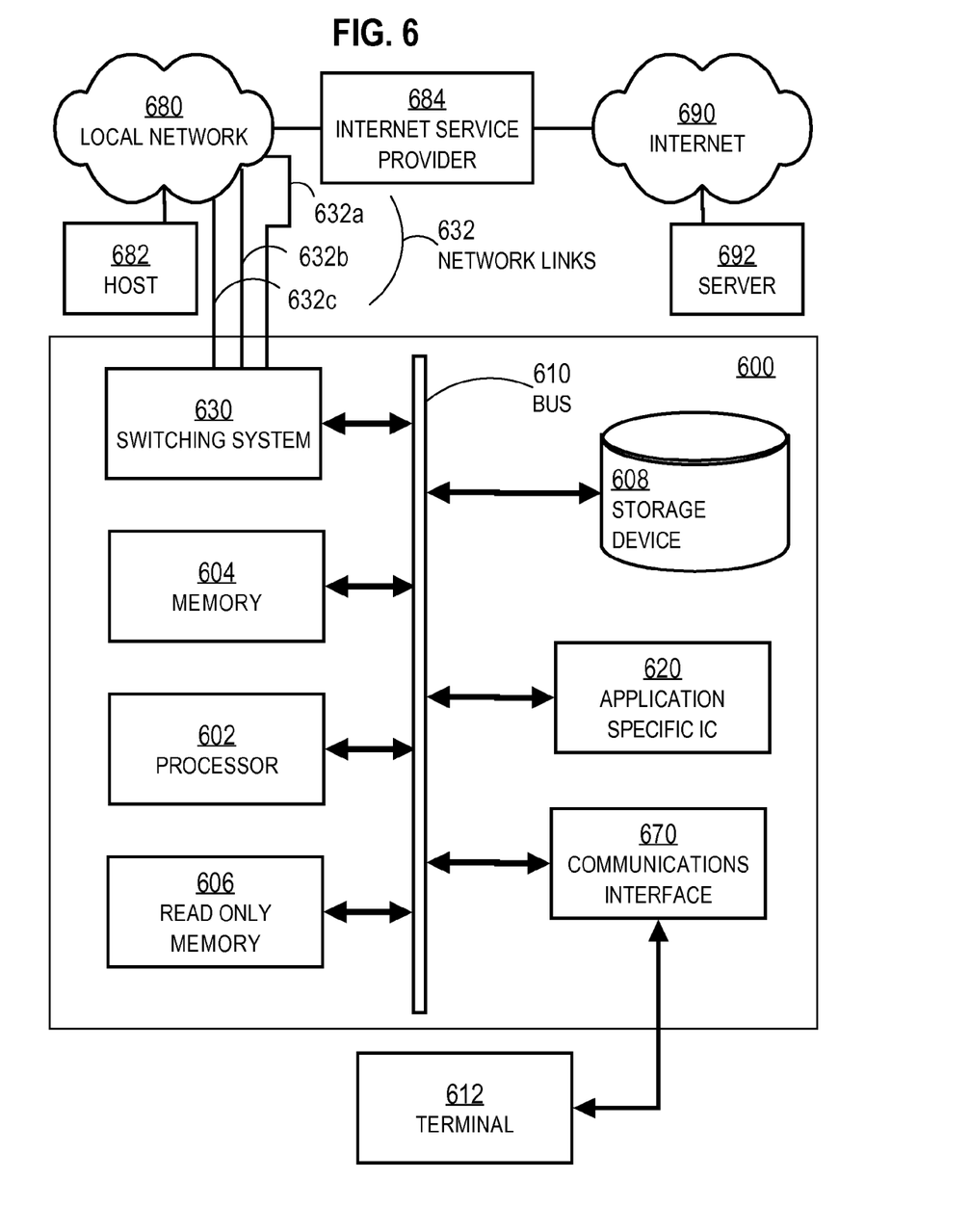
FIG. 6 is a block diagram that illustrates a computer system upon which an embodiment of the invention may be implemented.

FIG. 6 illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling via transmission media to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented using carrier waves. For wireless links, the communications interface 670 sends and receives electrical, acoustic or electromagnetic signals, including infrared and optical signals, which carry information streams, such as digital data.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments, an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication via transmission media through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632*a* and send it to the correct destination using output interface on link 632*c*. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software, unless otherwise explicitly stated.

The signals transmitted over network link 632 and other networks via transmission media through communications interfaces such as interface 670, carry information to and from computer system 600. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632*b* through communications interface in switching system 630. The received code may be executed by processor 602 or switching system 630 as it is received, or may be stored in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 632*b*. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing an interface between a visited network that supports the Simple Internet Protocol (SIP) and a home network that supports the Mobile Internet Protocol (MIP), the method comprising:
   by an interoperability and interworking function (IIF) module:
      determining that a mobile station, visiting the visited network or the visited network does not support MIP;
      upon determining that at least one of the mobile station, visiting the visited network, and the visited network does not support MIP, establishing a SIP compatible tunnel, between an access gateway process in the visited network and a Proxy Mobile Gateway of the IIF, and a MIP compatible tunnel between a Home Agent (HA) in the home network and a Proxy Foreign Agent of the IIF; and
      transmitting, over one of the SIP compatible tunnel and the MIP compatible tunnel using data packet encapsulation, data packets received at the IIF over the other tunnel.

2. A method as recited in claim 1, wherein
   the visited network is a General Packet Radio Service (GPRS) network, and
   wherein establishing a SIP compatible tunnel comprises establishing a GPRS Tunneling Protocol (GTP) version 0 tunnel between a Serving GPRS Support Node (SGSN) acting as access gateway process and the Proxy Mobile Gateway acting as a Gateway GPRS Support Node (GGSN).

3. A method as recited in claim 1, wherein establishing a MIP compatible tunnel comprises establishing an MIP generic routing encapsulation (GRE) tunnel.

4. A method as recited in claim 3, further comprising providing credentials through the Proxy Foreign Agent to the home network to set up the MIP GRE tunnel.

5. A method as recited in claim 1, wherein establishing a MIP compatible tunnel comprises establishing an MIP Internet Protocol (IP)-in-IP tunnel.

6. A method as recited in claim 1, wherein the home network is a Code Division Multiple Access (CDMA) network.

7. A method as recited in claim 1 wherein determining that the mobile station does not support MIP includes:
   receiving a request message to create a packet data protocol (PDP) context, the request message includes an access point name; and determining that the mobile station does not support MIP if the access point name does not begin with MIPv4.

8. A method as recited in claim 1 wherein MIP is determined to be not supported by the visited network based at least in part on the version of a tunneling protocol used for communication between the visited network and the IIF.

9. An Interoperability and Interworking Function (IIF) module of the type providing an interface between a visited General Packet Radio Service (GPRS) network and a home Code Division Multiple Access (CDMA) network, the IIF module comprising a Mobile Internet Protocol (MIP) Proxy module, including a MIP Proxy Mobile Gateway and a MIP Proxy Foreign Agent, the MIP Proxy module is configured to:
- determine that at least one of a mobile station, visiting the visited network, and the visited network does not support MIP;
- upon determining that at least one of the mobile station, visiting the visited network, and the visited network does not support MIP, establish a GPRS Tunneling Protocol (GTP) tunnel, between a Serving GPRS Support Node (SGSN) in the visited network and the MIP Proxy Mobile Gateway acting as a Gateway GPRS Support Node (GGSN), and a MIP generic routing encapsulation (GRE) tunnel between a Home Agent (HA) in the home network and the MIP Proxy Foreign Agent; and
- transmit, over one of the GTP tunnel and the MIP GRE tunnel, data packets received over the other tunnel.

10. An Interoperability and Interworking Function (IIF) module of the type providing an interface between a visited General Packet Radio Service (GPRS) network and a home Code Division Multiple Access (CDMA) network, the IIF module comprising a Mobile Internet Protocol (MIP) Proxy module, including a MIP Proxy Mobile Node and a MIP Proxy Foreign Agent, the MIP Proxy module comprising:
- means for determining that at least one of a mobile station, visiting the visited network, and the visited network does not support MIP;
- means for establishing a GPRS Tunneling Protocol (GTP) tunnel between a Serving GPRS Support Node (SGSN) in the visited network and the MIP Proxy Mobile Gateway acting as a Gateway GPRS Support Node (GGSN), upon determining that at least one of the mobile station, visiting the visited network, and the visited network does not support MIP;
- means for establishing an MIP generic routing encapsulation (GRE) tunnel between a Home Agent (HA) in the home network and the MIP Proxy Foreign Agent; and
- means for transmitting, over one of the GTP tunnel and the MIP GRE tunnel, data packets received over the other tunnel.

11. A non-transitory computer-readable medium having stored thereon computer-executable instructions for providing an interface between a visited network that supports the Simple Internet Protocol (SIP) and a home network that supports the Mobile Internet Protocol (MIP), wherein the computer-executable instructions when executed by one or more processors causes an apparatus to:
- at an interoperability and interworking function module:
  - determine that a mobile station, visiting the visited network or the visited network does not support MIP;
  - upon determining that at least one of the mobile station, visiting the visited network, and the visited network does not support MIP, establish a SIP compatible tunnel, between an access gateway process in the visited network and a Proxy Mobile Gateway of the IIF, and a MIP compatible tunnel between a Home Agent (HA) in the home network and a Proxy Foreign Agent of the IIF; and
  - transmit, over one of the SIP tunnel and the MIP compatible tunnel using data packet encapsulation, data packets received at the IIF over the other tunnel.

12. An apparatus for providing an interface between a visited network that supports the Simple Internet Protocol (SIP) and a home network that supports the Mobile Internet Protocol (MIP), the apparatus comprising: at least one memory having stored thereon computer-executable instructions; and at least one processor,
- the at least one memory and the computer-executable instructions, with the at least one processor, are configured to cause an apparatus to perform at least the following:
  - at an interoperability and interworking function module:
    - determine that at least one of a mobile station, visiting the visited network, and the visited network does not support MIP;
    - upon determining that at least one of the mobile station and the visited network does not support MIP, establish a SIP compatible tunnel, between an access gateway process in the visited network and a Proxy Mobile Gateway of the IIF, and a MIP compatible tunnel between a Home Agent (HA) in the home network and a Proxy Foreign Agent of the IIF; and
    - transmit, over one of the SIP compatible tunnel and the MIP compatible tunnel using data packet encapsulation, data packets received at the IIF over the other tunnel.

13. An apparatus as recited in claim 12 wherein the visited network is a General Packet Radio Service (GPRS) network, and wherein in establishing a SIP compatible tunnel, the apparatus is caused to establish a GPRS Tunneling Protocol (GTP) version 0 tunnel between a Serving GPRS Support Node (SGSN) acting as access gateway process and the Proxy Mobile Gateway acting as a Gateway GPRS Support Node (GGSN).

14. An apparatus as recited in claim 12 wherein in establishing a MIP compatible tunnel, the apparatus is caused to establish a MIP generic routing encapsulation (GRE) tunnel.

15. An apparatus as recited in claim 14 wherein the apparatus is further caused to provide credentials through the Proxy Foreign Agent to the home network to set up the MIP GRE tunnel.

16. An apparatus as recited in claim 12 wherein in establishing a MIP compatible tunnel, the apparatus is caused to establish a MIP Internet Protocol (IP)-in-IP tunnel.

17. An apparatus as recited in claim 12 wherein in determining that at least one of the mobile station and the visited network does not support MIP, the apparatus is caused to:
- receive a request message requesting to create a packet data protocol (PDP) context, the request message includes an access point name; and determine that the mobile station does not support MIP if the access point name does not begin with MIPv4.

18. An apparatus as recited in claim 12 wherein MIP is determined to be not supported by the visited network based at least in part on the version of a tunneling protocol used for communication between the visited network and the IIF.

19. An apparatus as recited in claim 12, wherein the home network is a Code Division Multiple Access (CDMA) network.

* * * * *

UNITED STATES PATENT AND TRADEMARK OFFICE
CERTIFICATE OF CORRECTION

PATENT NO.       : 8,520,609 B2                                                    Page 1 of 1
APPLICATION NO.  : 12/448867
DATED            : August 27, 2013
INVENTOR(S)      : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this
Fifteenth Day of September, 2015

Michelle K. Lee
*Director of the United States Patent and Trademark Office*